United States Patent
Chai et al.

(10) Patent No.: US 6,906,134 B2
(45) Date of Patent: *Jun. 14, 2005

(54) THERMOPLASTIC RESIN AND PREPARATION THEREOF

(75) Inventors: Joo-Byung Chai, Yeocheon (KR); Chan-Hong Lee, Yeocheon (KR); Byung-Tae Yang, Yeocheon (KR); Geon-Soo Kim, Yeocheon (KR)

(73) Assignee: LG Chem, Ltd. (KR)

( * ) Notice: Subject to any disclaimer, the term of this patent is extended or adjusted under 35 U.S.C. 154(b) by 9 days.

This patent is subject to a terminal disclaimer.

(21) Appl. No.: 10/250,876

(22) PCT Filed: Oct. 9, 2002

(86) PCT No.: PCT/KR02/01884

§ 371 (c)(1),
(2), (4) Date: Jul. 8, 2003

(87) PCT Pub. No.: WO03/044069

PCT Pub. Date: May 30, 2003

(65) Prior Publication Data

US 2004/0192843 A1 Sep. 30, 2004

(30) Foreign Application Priority Data

Nov. 20, 2001 (KR) ................................. 10-2001-0072446

(51) Int. Cl.[7] ............................................. C08F 279/04
(52) U.S. Cl. ........................... 525/64; 525/69; 525/243; 525/316
(58) Field of Search .......................... 525/64, 69, 243, 525/316

(56) References Cited

U.S. PATENT DOCUMENTS

| | | | |
|---|---|---|---|
| 4,046,839 A | | 9/1977 | Papetti ................... 260/880 R |
| 4,226,955 A | * | 10/1980 | Bracke et al. .............. 525/316 |
| 6,753,382 B2 | * | 6/2004 | Kim et al. ................... 525/316 |

FOREIGN PATENT DOCUMENTS

| | | |
|---|---|---|
| JP | 8-319327 | 12/1996 |
| JP | 2000-103935 | 4/2000 |
| JP | 2000-154291 | 6/2000 |

OTHER PUBLICATIONS

International Search Report; International application No. PCT/KR02/01884; International filing date Oct. 9, 2002; Jan. 31, 2003.

* cited by examiner

*Primary Examiner*—James J. Seidleck
*Assistant Examiner*—Olga Asinovsky
(74) *Attorney, Agent, or Firm*—Cantor Colburn LLP

(57) ABSTRACT

The present invention relates to ABS thermoplastic resin and preparation thereof, and particularly to a process for preparing an ABS graft copolymer comprising the step of introducing to a) 40 to 80 weight parts of rubber latex comprising i) 10 to 50 weight parts of large diameter polybutadiene rubber latex having a particle diameter of 2500 to 3500 Å, gel contents of 60 to 80%, and a swelling index to 12 to 30, and ii) 50 to 90 weight parts of large diameter rubber latex having a particle diameter of 2500 to 3500 Å, gel contents of 81 to 97%, and a swelling index of 18 to 40, b) 20 to 60 weight parts of a monomer mixture of two or more kinds selected from a group consisting of aromatic vinyl compounds and vinyl cyanide compounds to prepare a graft copolymer, wherein 5 to 30 wt % of the monomer mixture is introduced as a batch and simultaneously 70 to 95 wt % of the monomer mixture is started to be continuously introduced in an emulsified state, and a thermoplastic resin composition using the same. According to the process of the present invention, control of polymerization heat is easy even at high solid contents, and polymerization cohesion contents can be minimized and thus ABS thermoplastic resin having superior impact resistance, gloss, and coloring property can be provided.

9 Claims, No Drawings

THERMOPLASTIC RESIN AND PREPARATION THEREOF

BACKGROUND OF THE INVENTION (a) Field of the Invention

The present invention relates to a thermoplastic resin and preparation thereof, and particularly to an ABS thermoplastic resin and preparation thereof in which polymerization heat can be easily controlled even at a high rubber concentration and high total solid contents, and in which a monomer introduction method and introduction amount can be appropriately controlled to secure high impact strength and polymerization reproducibility.

(b) Description of the Related Art

Acrylonitrile-butadiene-styrene (hereinafter referred to as ABS) copolymer resin has superior qualities such as impact resistance, chemical resistance, processibility, and surface gloss, and thus it is used for monitor housings, game apparatus housings, electronic appliances, office equipment, etc., and the amount it is used tends to increase yearly. Changes in production line methods have increased yield by 1) reducing reaction time to reduce process time; 2) increasing total solid contents of latex; 3) increasing rubber contents in the latex; 4) decreasing rubber contents in final ABS injected or extruded articles, etc.

Among these methods, in order to 2) increase total solid contents and 3) increase rubber contents in the latex, monomers used in graft reaction are introduced in batches or they are continuously introduced. However, in the case of batch introduction with high total solid contents and high rubber contents, although these methods can obtain comparatively high impact resistance, because a cohered amount during polymerization is large and efficient graft reaction cannot be conducted, surface gloss and clearness drop due to a drop in dispersibility of rubber particles, and there is a difficulty in securing stable physical property values in mass-production. In addition, if such a batch introduction method is applied for mass-production, there are many difficulties in controlling an exothermic reaction heat amount, etc., and thus it has many problems in industrial applications.

Meanwhile, in the case of continuous introduction for preventing these problems, although it is favorable in terms of control of the exothermic reaction heat amount during polymerization, securing of latex stability, and surface gloss, etc., impact resistance and other physical properties of the final ABS product are inferior.

SUMMARY OF THE INVENTION

The present invention is made in consideration of the problems of the prior art, and it is an object of the present invention to provide a process for preparing an ABS graft copolymer that can simultaneously satisfy two effects of increase in total solid contents of latex and increase in rubber contents in latex.

It is another object of the present invention to provide an ABS thermoplastic resin composition comprising the ABS graft copolymer, in which it is easy to control polymerization heat, and which has superior polymerization product stability and improved impact resistance.

In order to achieve these objects, the present invention provides a process for preparing ABS thermoplastic resin comprising the step of introducing to a) 40 to 80 weight parts of rubber latex comprising i) 18 to 50 weight parts of large diameter polybutadiene rubber latex having a particle diameter of 2500 to 3500 Å, gel contents of 60 to 80%, and a swelling index of 12 to 30; and ii) 50 to 90 weight parts of large diameter rubber latex having a particle diameter of 2500 to 3500 Å, gel contents of 81 to 97%, and a swelling index of 18 to 40, b) 20 to 60 weight parts of a monomer mixture of two or more kinds selected from a group consisting of aromatic vinyl compounds and vinyl cyanide compounds to prepare a graft copolymer, wherein 5 to 30 wt % of the monomer mixture is introduced as a batch and 70 to 95 wt % of the monomer mixture is continuously introduced in an emulsified state.

The present invention also provides an ABS graft copolymer prepared by the above process.

The present invention also provides a thermoplastic resin composition comprising:

a) 20 to 50 weight parts of the ABS graft copolymer; and b) 50 to 80 weight parts of a SAN copolymer resin obtained by copolymerizing monomers of two or more kinds selected from a group consisting of an aromatic mono alkenyl monomer, a vinyl cyanide monomer, an acrylate alkyl ester monomer, and a methacrylate alkyl ester monomer.

DETAILED DESCRIPTION AND THE PREFERRED EMBODIMENTS

The present invention will now be explained in detail.

The present invention, in order to overcome disadvantages of the prior art, suitably uses batch introduction and continuous introduction when introducing monomers, contrary to conventional methods, and suitably controls the amount of introduced monomers, thereby securing latex stability in terms of high rubber contents and total solid contents and in developing a thermoplastic resin composition showing superior impact resistance.

In order to prepare a styrene thermoplastic resin composition having superior impact resistance, gloss, and coloring properties, in the present invention some of the total monomers are introduced as a batch at the initial reaction and remaining monomers are continuously introduced in an emulsified state, thereby facilitating control of the reaction temperature and decreasing the amount of cohered product. This will be explained in more detail.

(Preparation of Graft Copolymer)

According to the present invention, to 40 to 80 weight parts of one or more kinds of rubber latexes, being diene or alkyl acrylate compounds having different gel contents, 20 to 60 weight parts of a monomer mixture of two or more kinds selected from a group consisting of aromatic vinyl compounds and vinyl cyanide compounds are graft copolymerized in a ratio of 20:80 to 40:60 to prepare a copolymer by emulsion polymerization.

In order to induce an initiation reaction and for stability of emulsion polymerization, 0.6 to 2.0 weight parts of an emulsifying agent, 0.2 to 1.0 weight parts of a molecular weight controlling agent, 0.05 to 1.0 weight parts of a polymerization initiator, etc. can be used.

The diene or alkyl acrylate compound having different gel contents is preferably a polybutadiene mixture comprising 10 to 50 weight parts of a large diameter polybutadiene rubber latex having a particle diameter of 2500 to 3000 Å, gel contents of 60 to 80%, and a swelling index of 12 to 30; and 50 to 90 weight parts of a large diameter rubber latex having a particle diameter in the same range, gel contents of 81 to 97%, and a swelling index of 20 to 40.

Particularly, the present invention is characterized in that 5 to 30 wt % of the monomer mixture used to prepare the graft polymer is batch-introduced in the initial reaction to proceed the reaction, and simultaneously 70 to 95 wt % of the monomer mixture is immediately introduced or started to be continuously introduced in an emulsion state within 60 minutes after initiation of the reaction, preferably within 30 minutes. By such an introduction method, latex stability in terms of high rubber contents and total solid contents can be secured. Additionally, it is preferable to introduce a water-soluble polymerization initiator during batch introduction of the monomer mixture and to introduce a lipo-soluble polymerization initiator in continuous introduction.

After introduction is completed, the reaction further proceeds for 1 hour. The polymerization temperature is preferably 40 to 80° C., and polymerization time is preferably 2 to 7 hours.

The aromatic vinyl monomer is preferably selected from a group consisting of styrene, α-methylstyrene, o-ethylstyrene, p-ethylstyrene, vinyltoluene, and a mixture thereof. The vinylcyanide compound is preferably selected from a group consisting of acrylonitrile, methacrylonitrile, ethacrylonitrile, and a mixture thereof.

The emulsifying agent is preferably a reactive emulsifying agent alone, or a mixture of a reactive emulsifying agent and a common emulsifying agent (hereinafter referred to as 'non-reactive emulsifying agent').

As the non-reactive emulsifying agent, alkylaryl sulfonate, alkalimethylalkyl sulfate, a sulfonated alkylester, a fatty-acid soap, an alkyl salt of rosin acid, etc. can be used alone or in combination of two or more kinds.

The reactive emulsifying agent includes a neutral emulsifying agent or an anionic emulsifying agent having an allyl group, a methacryloyl group, or a propenyl group. The anionic agent having an allyl group includes, as a representative example, a sulfate salt of polyoxyethylene allylglycidyl nonylphenyl ether, and ADEKARIA SOAP SE (Asahi Denka Company product) is a commercially available example thereof. In addition, an anionic reactive emulsifying agent having an alkenyl group includes an alkenyl succinate salt (LATEMUL ASK, Kao Company product), etc. Also, a neutral emulsifying agent having an allyl group includes polyoxyethylene alikylglycidyl nonylphenyl ether, and ADEKARIA SOAP NE (Asahi Denka Company product) is a commercially available example thereof.

As the anionic emulsifying agent having a methacryloyl group, ELEMINOL RS (Sanyo Kasei Company product) is a commercially available example, and as the neutral emulsifying agent, RMA-560 type (Nippon Surfactant Company product) is a commercially available example. The anionic emulsifying agent having ammonium sulfate salt of a propenyl group includes polyoxyethylene allylglycidyl nonyl propenyl phenyl ether, and AQUARON HS is a commercially available example thereof; and the neutral emulsifying agent includes AQUARON BC (Daiichi Kogyo Seiyaku Company product) as an example. The reactive emulsifying agent can be used alone or in combination of two or more kinds, and it can be mixed and used with a common emulsifying agent. The amount of reactive emulsifying agent used in ABS polymerization is preferably 0.1 to 2.0 weight parts.

As the molecular weight controlling agent, tert-dodecyl mercaptan is mainly used. As the polymerization initiator, a peroxide such as t-butyl hydroperoxide, cumenehydroperoxide, diisopropylbenzenehydro peroxide, persulfate, etc. is used; and an oxidation-reduction catalyst such as sodium formaldehyde, sulfoxylate, sodiumethylenediamine tetraacetate, ferrous sulfate, dextrose, sodium pyrophosphate, sodium persulfate, etc. is used.

The polymerized latex can be cohered using a well-known cohesive agent sulfate or $MgSO_4$, $CaCl_2$, $Al2(SO_4)_3$, etc. to obtain powder.

(Thermoplastic Resin)

The polymerized latex prepared in the above is cohered and dehydrated to dry itto provide a thermoplastic resin composition (ABS) by graft polymerization (ABS). According to the present invention, an ABS graft copolymer and a SAN copolymer resin can be prepared in a weight ratio of 20:80 to 50:50 to obtain a thermoplastic resin having superior impact resistance and thermo-stability.

The SAN resin is prepared by copolymerizing two or more kinds of monomers selected from a group consisting of a monoalkenyl monomer, a vinyl cyanide monomer, an acrylate alkyl ester monomer, and a methacrylate alkyl ester monomer. The thermoplastic resin composition comprises commonly used additives such as a lubricant, etc.

The present invention will be explained in more detail with reference to the following Examples. However, these are to illustrate the present invention and the present invention is not limited to them.

EXAMPLE

Example 1

In a nitrogen-substituted polymerization reactor, to a mixture of 30 weight parts of rubber latex (A) having a rubber particle diameter of 3100 Å and gel contents of 70%, and 25 weight parts of rubber latex (B) having a rubber particle diameter of 3100 Å and gel contents of 90%, ingredients shown in Table 1, specifically 90 weight parts of ion exchanged water, 0.04 weight parts of a potassium salt of rosin acid emulsifying agent, and 0.01 weight parts of potassium alkenyl succinate were introduced, and the temperature in the reactor was maintained at 50° C. 7.2 weight parts of styrene, 2.8 weight parts of acrylonitrile, 0.3 weight parts of tert-dodecylmercaptan, 0.087 weight parts of sodium pyrophosphate, 0.11 weight parts of dextrose, 0.002 weight parts of ferrous sulfate, and 0.1 weight parts of t-butyl hydroperoxide were then introduced into the batch.

Simultaneously, addition of a mixed emulsion solution of 10 weight parts of ion exchanged water, 25.2 weight parts of styrene, 9.8 weight parts of acrylonitrile, 0.8 weight parts of potassium salt of rosin acid, 0.2 weight parts of potassium alkenyl succinate, 0.019 weight parts of sodium pyrophosphate, 0.025 weight part of dextrose, 0.001 weight parts of ferrous sulfate, and 0.10 weight parts of cumenehydroperoxide was started and it was continuously introduced for 140 minutes. The reaction temperature was elevated to 70° C. for 50 minutes, and then maintained at 70° C. for 90 minutes. After continuous introduction, the temperature was elevated again, to 80° C., and the reaction mixture was aged for 1 hour and the reaction was terminated. The polymerization rate was 98.9%, and total solid contents were 46.2% while solid cohesion contents were 0.02%.

An antioxidant emulsion solution (particle size: 0.5 μm or less) was then introduced to the polymerized latex, and the latex was cohered with 2 weight parts of a sulfate aqueous solution, and then washed and dried to obtain a powdered graft copolymer. Then, SAN having a weight average molecular weight of approximately 100,000 and acrylonitrile contents of approximately 28%, and a lubricant, etc. were introduced, and the copolymer was extrusion, injection molded to prepare a sample with total rubber contents of 16%, and the physical properties thereof are shown in Table 2.

Examples 2 and 3

A graft copolymer was prepared by the same method as in Example 1, except that the compositional ratio was changed as shown in Table 1. For Example 3, the compositional ratio was as shown in Table 1, except that the total rubber latex contents were changed to 60 weight parts in the rubber compositional ratio (In the following Table 1, the compositional ratio of TDDM, initiator, and ACTIVATOR are not indicated because the same amounts were used.).

Comparative Examples 1 and 2

A graft copolymer was prepared with the same composition as in Example 1, but the initial monomers (7.2 weight parts of styrene, 2.8 weight parts of acrylonitrile) were batch-introduced and the temperature was elevated to 70° C. for 50 minutes, and then an emulsion comprising the remaining monomers and the emulsifying agent were continuously introduced in the compositional ratio as shown in Table 1 while maintaining 70° C. for 90 minutes. As the emulsifying agent, only potassium rosin acid was used, unlike in Examples 1 to 3. After reaction, an antioxidant dispersion (particle size 0.7~1.5 μm) was introduced to cohere and dry, and the subsequent sample preparation method is the same as in Example 1.

For Comparative Example 2, polymerization was conducted by the same method as in Comparative Example 1, except that the amount of monomers batch-introduced increased, as shown in Table 1. Physical properties are shown in Table 2.

Comparative Example 3

A graft copolymer was prepared with the same composition as in Example 3, but the total amount (28.8 weight parts of styrene, 11.2 weight parts of acrylonitrile) was continuously introduced without batch introduction. The physical properties are shown in Table 2.

The physical properties of the copolymers of Examples 1 to 3 and Comparative Examples 1 to 3 were measured as follows:

A. Izod impact strength test: measured according to the ASTM D256 method. Thickness of a sample was ¼".

B. Tensile strength test: measured according to the ASTM D638 method.

C. Melt Flow Index (MI): measured according to the ASTM D1238 method under conditions of 10 Kg at 220° C.

D. Surface gloss: measured according to the ASTM D528 method, at a 45° angle.

E. Latex stability: 400 g of polymerized latex was introduced into a 1000 ml beaker and agitated at 15,000 rpm using a homomixer to measure when the first cohered product is produced.

F. Solid cohesion contents (%): Cohered contents in polymerized product produced after reaction is terminated. Calculated by the following Equation:

$$\text{Solid cohered contents[\%]} = \frac{\text{Weight of produced cohered product in reactor[g]}}{\text{Weight of total rubber and monomers}} \times 100 \quad \text{[Equation 1]}$$

G. Polymerization exothermal amount: measured using a temperature difference between a maximum temperature in a reactor and a temperature outside of the reactor. Generally, if a reaction temperature difference is 10° C. or more, it is judged that in practical application, the polymerization temperature and physical properties are difficult to control, and as the difference becomes smaller, reaction conditions become more stable.

TABLE 1

Polymerization composition and latex physical properties

|  | (Weight part) | Example 1 | Example 2 | Example 3 | Comparative Example 1 | Comparative Example 2 | Comparative Example 3 |
|---|---|---|---|---|---|---|---|
| Batch-introduction | Ion exchanged water | 90 | 90 | 110 | 90 | 90 | 110 |
|  | Rubber A | 30 | 30 | 32 | 30 | 30 | 32 |
|  | Rubber B | 25 | 25 | 28 | 25 | 25 | 28 |

TABLE 1-continued

Polymerization composition and latex physical properties

|  |  | Example | | | Comparative Example | | |
|---|---|---|---|---|---|---|---|
| (Weight part) | | 1 | 2 | 3 | 1 | 2 | 3 |
| | Potassium salt of rosin acid | 0.04 | 0.04 | 0.04 | 0.1 | 0.1 | 0.1 |
| | Alkenyl succinate salt | 0.01 | 0.01 | 0.01 | — | — | — |
| | Styrene | 7.2 | 14.4 | 6.48 | 7.2 | 14.4 | — |
| | Acrylonitrile | 2.8 | 5.6 | 2.5 | 2.8 | 5.6 | — |
| Continuous | Ion exchanged water | 10 | 10 | 20 | 10 | 10 | 20 |
| Introduction | Potassium salt of rosin acid | 0.8 | 0.8 | 0.8 | 1.2 | 1.2 | 1.2 |
| | Alkenyl succinate salt | 0.2 | 0.2 | 0.2 | — | — | — |
| | Styrene | 25.2 | 25.2 | 22.3 | 15.8 | 15.8 | 28.8 |
| | Acrylonitrile | 9.8 | 9.8 | 8.7 | 6.7 | 6.7 | 11.2 |
| | Introduction time (after initiation of reaction) (min.) | 0 | 5 | 10 | 50 | 50 | 0 |
| Physical properties | Polymerization conversion rate (%) | 98.9 | 99.1 | 98.6 | 97.5 | 97.9 | 98.4 |
| | Total solid contents (%) | 46.2 | 46.3 | 37.1 | 46.2 | 46.2 | 37.1 |
| | Cohesion contents (%) | 0.02 | 0.03 | 0.02 | 0.15 | 0.21 | 0.07 |
| | Exothermal amount (° C.) | 2 | 3 | 2 | 5 | 10 | 2 |

As shown in Table 1, Examples 1 to 3 show very low exothermal amounts, and thus very little polymerization cohesion product compared to Comparative Examples 1 to 3. Additionally, it can be seen that in Example 3, cohesion contents decrease according to change in kind of emulsifying agent, and in Examples 1 and 2, despite the solid contents increase, cohesion contents were small compared to Comparative Examples.

TABLE 2

|  | Example 1 | Example 2 | Example 3 | Comparative Example 1 | Comparative Example 2 | Comparative Example 3 |
|---|---|---|---|---|---|---|
| Izod impact strength (¼") (kg · cm/cm) | 27 | 28 | 24 | 25 | 28 | 21 |
| Tensile strength (kg/cm²) | 510 | 507 | 520 | 504 | 500 | 450 |
| Melt Flow index (g/10 min) | 20 | 19 | 21 | 20 | 18 | 21 |
| Surface gloss (45°) | 95 | 94 | 96 | 84 | 87 | 92 |

As shown in Table 2, Examples 1 to 3 of the present invention had surface gloss, Izod impact strength, tensile strength, and melt flow index that were superior to Comparative Examples 1 to 3.

As explained, according to the process of the present invention, control of polymerization reaction heat is easy even at high solid contents, and production of a polymerization cohesion product can be minimized, and thus an ABS thermoplastic resin having superior impact resistance, gloss, and coloring properties can be provided.

What is claimed is:

1. A process for preparing an ABS graft copolymer comprising the steps of introducing to
   a) 40 to 80 weight parts of rubber latex comprising
      i) 10 to 50 weight parts of large diameter polybutadiene rubber latex having a particle diameter of 2500 to 3500 Å, gel contents of 60 to 80%, and a swelling index to 12 to 30; and
      ii) 50 to 90 weight parts of large diameter polybutadiene rubber latex having a particle diameter of 2500 to 3500 Å, gel contents of 81 to 97%, and a swelling index of 18 to 40,
   b) 20 to 60 weight parts of a monomer mixture of two or more kinds selected from a group consisting of aromatic vinyl compounds and vinyl cyanide compounds to prepare a graft copolymer, wherein 5 to 30 wt % of the monomer mixture is introduced in a batch, and simultaneously 70 to 95 wt % of the monomer mixture is started to be continuously introduced in an emulsified state, and
   introducing a water-soluble polymerization initiator in the batch-introduction of the monomer mixture; and
   introducing a liposoluble polymerization initiator in the continuous introduction of the monomer mixture in the emulsified state.

2. The process for preparing an ABS graft copolymer according to claim 1, wherein the aromatic vinyl monomer is selected from a group consisting of styrene, α-methylstyrene, o-ethylstyrene, p-ethylstyrene, vinyltoluene, and a mixture thereof.

3. The process for preparing an ABS graft copolymer according to claim 1, wherein the vinyl cyanide monomer is selected from a group consisting of acrylonitrile, methacrylonitrile, ethacrylonitrile, and a mixture thereof.

4. The process for preparing an ABS graft copolymer according to claim 1, wherein the graft copolymerization comprises the step of further introducing 0.6 to 2.0 weight parts of a reactive emulsifying agent or a mixed emulsifying agent of a reactive emulsifying agent and a non-reactive emulsifying agent, 0.2 to 1.0 weight parts of a molecular weight controlling agent, and 0.05 to 1.0 weight parts of a polymerization initiator.

5. The process for preparing an ABS graft copolymer according to claim 4, wherein the non-reactive emulsifying agent is selected from a group consisting of alkylaryl sulfonate, alkalimethylalkyl sulfate, sulfonated alkylester, a fatty-acid soap, an alkyl salt of rosin acid, and a mixture thereof.

6. The process for preparing an ABS graft copolymer according to claim 4, wherein the reactive emulsifying agent is an anionic emulsifying agent having an alkyl group, a methacryloyl group, or a propenyl group; or a neutral emulsifying agent having an alkyl group, a methacryloyl group, or a propenyl group.

7. An ABS graft copolymer prepared by the process of claim 1.

8. A thermoplastic resin composition comprising:
  a) 20 to 50 weight parts of the ABS graft copolymer of claim 7; and
  b) 50 to 80 weight parts of a SAN copolymer resin obtained by copolymerizing monomers of two or more kinds selected from a group consisting of aromatic monoalkenyl monomers, vinyl cyanide monomers, acrylate alkyl ester monomers, and a methacrylate alkyl ester monomers.

9. The process for preparing an ABS graft copolymer according to claim 1, wherein the 70 to 95 wt % of the monomer mixture is started to be continuously introduced in an emulsified state within 60 minutes after the 5 to 30 w % of the monomer mixture is introduced in a batch.

* * * * *